(12) United States Patent
Kilpatrick et al.

(10) Patent No.: US 10,437,776 B1
(45) Date of Patent: *Oct. 8, 2019

(54) SYSTEMS AND METHODS FOR SELECTING FOLDERS FOR UPLOADING TO A CLOUD FILE SYSTEM

(71) Applicant: Google LLC, Mountain View, CA (US)

(72) Inventors: Ian Kilpatrick, Forest Lodge (AU); Cayden Meyer, Pyrmont (AU)

(73) Assignee: GOOGLE LLC, Mountain View, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 15/984,274

(22) Filed: May 18, 2018

Related U.S. Application Data

(63) Continuation of application No. 14/260,509, filed on Apr. 24, 2014, now Pat. No. 9,990,365.

(51) Int. Cl.
*G06F 16/11* (2019.01)

(52) U.S. Cl.
CPC .................. *G06F 16/119* (2019.01)

(58) Field of Classification Search
None
See application file for complete search history.

(56) References Cited

U.S. PATENT DOCUMENTS

| | | | |
|---|---|---|---|
| 7,529,785 | B1 | 5/2009 | Spertus et al. |
| 8,433,674 | B2 | 4/2013 | Takata et al. |
| 9,489,497 | B2 | 11/2016 | MaGill et al. |
| 9,824,094 | B1 | 11/2017 | Meyer et al. |
| 2003/0149793 | A1* | 8/2003 | Bannoura ............... H04L 29/06 709/247 |
| 2007/0226213 | A1 | 9/2007 | Al-Marsi |
| 2011/0022642 | A1 | 1/2011 | deMilo et al. |
| 2011/0246719 | A1 | 10/2011 | Knox et al. |
| 2011/0265077 | A1 | 10/2011 | Collison et al. |
| 2011/0276538 | A1 | 11/2011 | Knapp et al. |
| 2011/0276656 | A1 | 11/2011 | Knapp et al. |
| 2013/0191397 | A1 | 7/2013 | Avadhanam et al. |
| 2014/0108956 | A1 | 4/2014 | Varenhorst et al. |
| 2014/0237377 | A1* | 8/2014 | Meissner ............... G06Q 30/02 715/745 |

FOREIGN PATENT DOCUMENTS

WO     2014032608     3/2014

OTHER PUBLICATIONS

International Search Report and Written Opinion dated Jul. 2, 2015 for International Application PCT/US2015/026540, International Filing Date Apr. 17, 2015.
PCT International Search Report and Written Opinion for PCT/US2015/026540 dated Apr. 17, 2015.

* cited by examiner

*Primary Examiner* — Amresh Singh
(74) *Attorney, Agent, or Firm* — Lowenstein Sandler LLP

(57) ABSTRACT

Systems and methods are disclosed herein for selecting folders to upload to a cloud system. A plurality of folders on a client system is identified, where the plurality of folders is associated with metadata. A respective score for each folder in the plurality of folders is evaluated by applying a set of rules to the metadata. A subset of folders is selected from the plurality of folders based on the respective scores, and a recommendation is provided to upload the subset of folders to the cloud system.

20 Claims, 9 Drawing Sheets

| FOLDER ID | FILE IDS | SIZE | TIME OF CREATION | TIME OF LAST EDIT | FOLDER DEPTH |
|---|---|---|---|---|---|
| A138 | 154, 1857, 156, 382, 593 | 20.4 MB | JAN-21-2014 9:10 AM | JAN-24-2014 1:09 PM | 4 |
| A1478 | 675, 1526, 122, 512 | 827 MB | AUG-08-2010 12:05 PM | JAN-23-2014 11:20 AM | 5 |
| A832 | 2435 | 0.1 MB | MAR-31-2011 4:23 PM | MAR-31-2011 4:23 PM | 4 |
| A104 | 1839, 282, 842, 295 | 14.8 MB | JUL-09-2013 2:58 PM | JUL-09-2013 2:58 PM | 6 |
| A294 | 2957, 192, 573, 931, 121 ... | 12.2 MB | MAR-31-2011 4:40 PM | MAR-31-2011 4:40 PM | 9 |
| A392 | 172, 694, 283 | 2.4 MB | SEP-20-2013 1:10 PM | SEP-20-2013 1:10 PM | 5 |

| FOLDER ID | FILE IDS | SIZE TYPE | TIME OF CREATION – RECENT? | TIME OF LAST EDIT – RECENT? | FOLDER DEPTH – DEEP? | SCORE | SELECT THIS FOLDER TO UPLOAD? |
|---|---|---|---|---|---|---|---|
| A138 | 154, 1857, 156, 382, 593 | LARGE | YES | YES | NO | 0.9 | YES |
| A1478 | 675, 1526, 122, 512 | LARGE | NO | YES | NO | 0.8 | YES |
| A832 | 2435 | SMALL | NO | NO | NO | 0.1 | NO |
| A104 | 1839, 282, 842, 295 | LARGE | YES | YES | YES | 0.6 | YES |
| A294 | 2957, 192, 573, 931, 121 ... | LARGE | NO | NO | YES | 0.2 | NO |
| A392 | 172, 694, 283 | SMALL | YES | YES | NO | 0.2 | NO |

FIG. 3

SYSTEMS AND METHODS FOR SELECTING FOLDERS FOR UPLOADING TO A CLOUD FILE SYSTEM

FIELD OF THE INVENTION

In general, this disclosure relates to data storage, in particular, to systems and methods for selecting folders for uploading to cloud storage.

BACKGROUND

Web-based storage systems are file hosting systems that allow users to store and retrieve data accessible from one or more user devices. These storage systems may use cloud storage to store user data. Known methods for uploading user data to cloud storage may require a user to provide manual selection of a set of files or folders for uploading to cloud storage.

SUMMARY

Systems and methods are disclosed herein for selecting folders for uploading to a cloud system. A plurality of folders on a client system is identified, where the plurality of folders is associated with metadata. A respective score for each folder in the plurality of folders is evaluated by applying a set of rules to the metadata. A subset of folders is selected from the plurality of folders based on the respective scores, and a recommendation is provided to upload the subset of folders to the cloud system.

Another aspect relates to a system including means for selecting folders for uploading to a cloud system. The system includes means for identifying the plurality of folders on a client system, where the plurality of folders is associated with metadata and means for evaluating a respective score for each folder in the plurality of folders by applying a set of rules to the metadata. The system further includes means for selecting a subset of folders from the plurality of folders based on the respective scores, and means for providing a recommendation to upload the subset of folders to the cloud system.

In some embodiments, the means for selecting the subset of folders performs the selecting based on a comparison between the respective scores and a first threshold, and the folders associated with respective scores that exceed the first threshold are selected. The system may further include means for selecting a further subset of folders from the plurality of folders, wherein the further subset of folders have respective scores that are below a second threshold that is lower than the first threshold, and means for providing a recommendation to not upload the further subset of folders to the cloud system.

In some embodiments, the respective score for each respective folder in the plurality of folders is indicative of a likelihood that a user would select to upload content of the respective folder to the cloud system. The system may further include means for receiving a user input indicative of a modification of the subset of folders. The set of rules may be formed based on a machine learning technique and is trained on existing cloud data in a cloud system. In some embodiments, the metadata includes at least two of: folder size, number of files, types of files, number of document files, file data, content of files, number of subfolders, and frequency of accesses to files in the folder. The metadata may include a set of binary features that describe each folder in the plurality of folders.

In some embodiments, the means for evaluating the respective scores includes a processor that is stored on the client system and applies the set of rules to the plurality of folders. The system may include means that are stored on the cloud system for periodically updating the set of rules based on updated cloud data.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 2 is an example data structure stored on a database that includes data related to folders that are stored on a local storage device, according to an illustrative embodiment.

FIG. 3 is an example data structure stored on a database that includes processed data related to folders that are stored on a local storage device, according to an illustrative embodiment.

DETAILED DESCRIPTION

To provide an overall understanding of the disclosure, certain illustrative embodiments will now be described, including a system for selecting folders for uploading to a cloud storage system. In particular, a device is described that allows for automatic selection of one or more folders for uploading to cloud storage. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

The present disclosure provides systems and methods for providing automatic folder selection for uploading from a client system such as a local storage device to a cloud system such as a web-based storage system. The systems and methods described herein allow for a set of user folders on a local storage system to be assigned scores that are indicative of predicted likelihoods that a user would want the folders to be uploaded to the cloud system. By scoring the user folders according to this predicted likelihood, the system allows for automatic selection of a subset of a user's data for uploading to the cloud system without requiring manual user input. The systems and methods of the present disclosure are described herein in terms of a web-based storage system, which may communicate with other systems over a network to store and share user data. In general, one of ordinary skill in the art will understand that the systems and methods described herein are applicable to systems that are locally interconnected without departing from the scope thereof.

Figure 1:
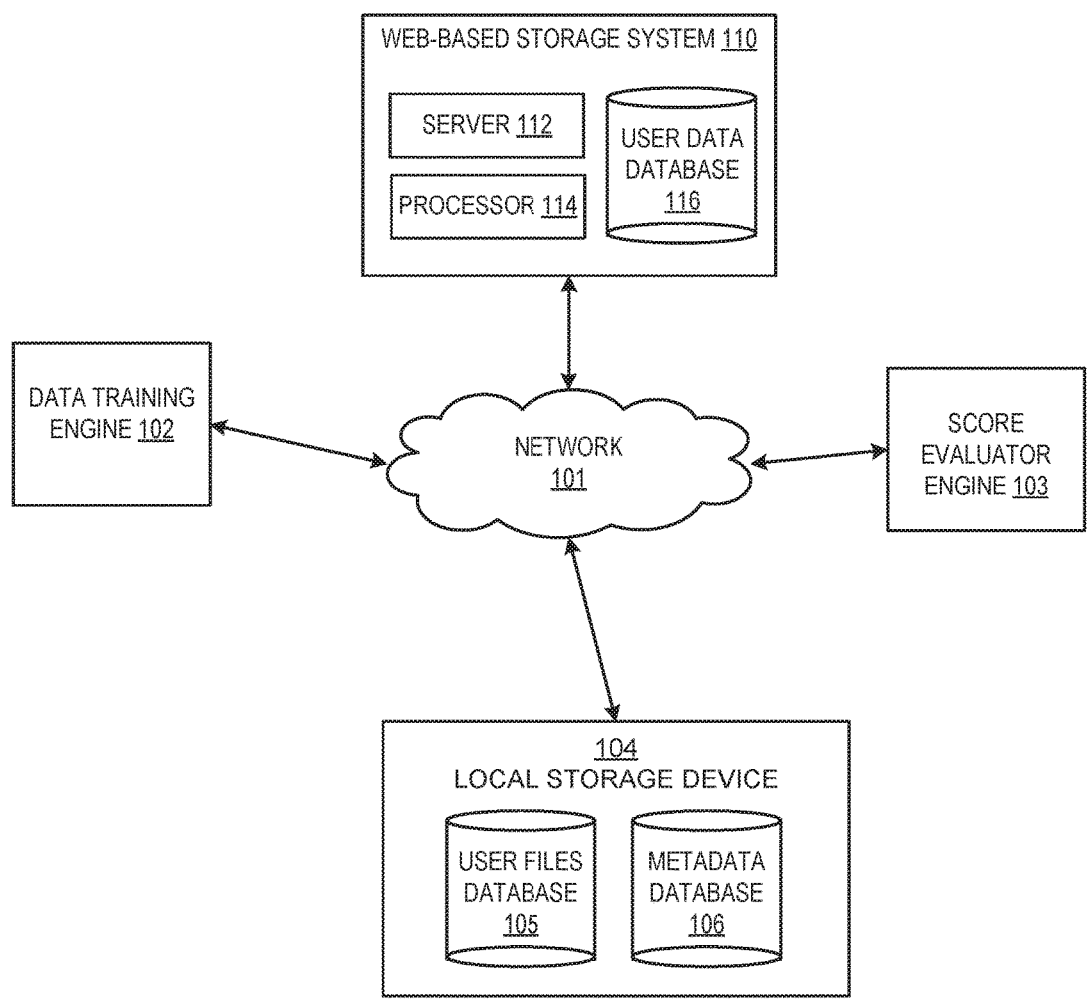
FIG. 1 is a block diagram of a computerized system for allowing data stored on a local storage device to be uploaded to a web-based storage system, according to an illustrative embodiment.

FIG. 1 depicts an example of a network and database structure that may be used to implement the systems and methods herein. FIG. 1 is a block diagram of a computerized system 100 for allowing data stored on a local storage device to be uploaded to a web-based storage system. The system 100 includes a web-based storage system 110, a local storage device 104, a data training engine 102, and a score evaluator engine 103, all configured to communicate over a network 101. The local storage device 104 includes a user files database 105 that stores files that may be organized according to a hierarchy of folders. The local storage device 104 further includes a metadata database 106 that stores metadata related to the files in the user files database 105. The web-based storage system 110 includes a server 112, a processor 114, and a user data database 116. The data training engine 102 is configured to communicate with the web-based storage system 110 to allow the data training engine 102 to have access to user data that is stored on the web-based storage system 110, such as in a user data database 116. The data training engine 102 processes the user data on the web-based storage system 110 to obtain a scoring system, which may be a set of rules that define a way to score a set of folders based on the characteristics of those folders. The folder characteristics of a folder may include any number of features or metadata associated with the files that are stored in the respective folder. The scoring system may have the form of a machine learning system, a machine learning classifier, or any other suitable system for scoring a set of folders. The machine learning system may involve Bayesian statistics, neural networks, support vector machine models, or any other suitable type of machine learning technique. The set of rules defined by the scoring system is then applied by the score evaluator engine 103 to user data that is stored on the local storage device to assign a set of scores to the folders that are used to organize the user's files stored on the local storage device 104. The scores are used to determine a subset of the folders stored on the local storage device 104 for uploading to the web-based storage system 110. As used herein, the term "processor" refers to one or more computers, microprocessors, logic devices, servers, or other devices configured with hardware, firmware, and software to carry out one or more of the computerized techniques described herein. Processors and processing devices may also include one or more memory devices for storing inputs, outputs, and data that are currently being processed. Only one web-based storage system 110, one local storage device 104, one data training engine 102, and one score evaluator engine 103 are shown in FIG. 1 to avoid complicating the drawing. In general, the system 100 can support multiple web-based storage systems, data training engines, score evaluator engines, and local storage devices.

The web-based storage system 110 is a file hosting system that allows users to store, retrieve, and modify data. This data may be referred to as a user's web data, which is stored in the user data database 116. The server 112, the processor 114, or both may perform functions related to maintaining the user data database 116, such as allocating memory for the data, receiving new data to be stored in the database, deleting data in the database, providing indications of how much storage space is available in the database, or any other suitable function related to database maintenance. The web-based storage system 110 may be stored on a single server system or in a distributed system. In particular, the web-based storage system 110 may use cloud storage to store user data.

It may be desirable to a user of the local storage device 104 for some of the user folders stored on the local storage device 104 to be uploaded to the web-based storage system 110. As an example, the local storage device 104 may be a personal computer device, and the user of the local storage device 104 may have access to other personal devices such as other personal computers, laptops, mobile devices, or tablets that are also capable of communicating with the web-based storage system 110 over the network 101. In this case, it may be desirable to allow the user to use multiple devices that have access to the same set of files that are stored on the web-based storage system 110. One way for selecting which files or folders to upload to the web-based storage system 110 is to require the user to manually select which files or folders on the local storage device 104 should be uploaded. However, requiring the user to manually select each folder or subfolder for uploading is time consuming and may be undesirable. An alternative and more convenient approach is to automatically select a subset of the folders on the local storage device 104 for uploading to the web-based storage system 110. Those folders that are automatically selected may be provided to a user as suggested or recommended for uploading, and the user may be prompted to modify the selected set of folders if any changes are desired. The subset of folders may be selected as those that are predicted to be the most likely folders that the user would select to be uploaded. The local storage device 104 is described in detail in relation to FIG. 5. As shown in FIG. 1, the user files database 105 and the metadata database 106 are shown as separate databases, but in general, data stored on the user files database 105 and the metadata database 106 may be stored on the same database or different databases.

The user may have access to the web-based storage system 110 over the network 101 from other user devices such as a laptop, a personal computer, a tablet, a mobile device, or any other suitable device that may have access to the network 101. It may be desirable to allow the user to access the same set of files stored on the web-based storage system 110 from multiple devices.

In one example, the local storage device 104 stores a first folder containing program files and a second folder containing documents. The program files in the first folder may have been created one year ago, and the user may not access or modify the program files often. In contrast, the user has recently accessed and modified the documents in the second folder. In this case, the probability that the user would select to upload the second folder to the web-based storage system 110 is likely to be greater than the probability that the user would select to upload the first folder. This is because it is more likely that the user will wish to access the document files from devices other than the local storage device 104, or that the user will wish to generate a backup copy of the documents in the second folder. The score evaluator engine 103 is configured to recognize the difference in probabilities of user upload selection between the first folder and the second folder, and should select to upload the documents in the second folder over the program files in the first folder. The higher score assigned to the second folder causes the documents to be selected for uploading to the web-based storage system 110, and the lower score assigned to the first folder causes the program files to not be selected for uploading.

The scoring method that is applied by the score evaluator engine 103 is determined from a set of rules based on the metadata that is stored in the metadata database 106. In particular, the metadata includes data that characterizes each folder stored on the user files database 105. An example data structure that includes some example forms of metadata is shown and described in relation to FIG. 2. In particular, the metadata may include file identifiers for the files contained within the folder, a size of the folder, a time of creation of the folder, a time of last edit of the folder, a folder depth of the folder, or any combination thereof. In general, any suitable metadata that characterizes a folder and may serve as a predictor of a likelihood that the user will desire to have access to the folder on the web-based storage system 110 may be used. In an example, metadata that may be used by the score evaluator engine 103 include the type or types of the files contained within a folder (such as whether the files contain media content, document content, image content, or any other suitable file content), the number of files within a folder, the size distribution of the files within a folder, the frequency of the files in the folder being edited or accessed, a number of subfolders contained within a folder, or any content within the files, such as keywords, title, or filenames of the files. Moreover, the metadata may include an indication of whether the folder is located on a home directory of the local storage device 104 or on an external disk coupled to the local storage device 104. The metadata is used by the score evaluator engine 103 to assign a score to each folder in a set of folders to determine whether to recommend one or more folders in the set of folders for uploading to the web-based storage system 110.

The data training engine 102 may perform a machine learning technique on a set of user files that are stored on the user data database 116 in the web-based storage system 110. The machine learning technique results in the set of rules that are used by score evaluator engine 103 to assign scores to folders on the local storage device 104. As used herein, to "train" a data set means to generate a scoring set of rules that may accurately predict a likelihood that a user will wish to synchronize a particular folder stored on the local storage device 104 with the web-based storage system 110. The data training engine 102 trains the data by receiving two inputs: an input vector and an answer vector. As used herein, the input vector refers to metadata that is associated with the folders and user files that are stored on the user data database 116, and the answer vector refers to a known indication of whether a folder with certain characteristics has been uploaded. The answer vector may be a binary vector having one value if the folder is uploaded and having a different value if the folder is not uploaded.

The data training engine 102 applies statistical modeling methods to fit a predictive model that may be used to predict a likelihood, based on the metadata of the input vector, that a user will select to upload a particular folder from the local storage device 104 to the web-based storage system 110. The predictive model includes the set of rules that define how certain features of a folder or a file, such as its metadata, are predicted to affect the upload likelihood by the user. The predicted upload likelihoods of the set of folders (as predicted by the predictive model) are compared to whether the folder is actually uploaded or not (i.e., the answer vector). If the predictions mostly match the actual behavior, the predictive model has performed well. However, if there are substantial differences between the predictions and the actual behavior, one or more parameters of the predictive model may be updated, and the updated predictions may be compared to the actual behavior. These steps are repeated until the performance of the predictive model satisfies one or more criteria, such as exceeding a threshold, and the data training engine 102 provides the final resulting predictive model to the score evaluator engine 103 over the network 101. The score evaluator engine 103 then applies the final predictive model to the test data set (i.e., a set of folders stored on the local storage device 104 for assessment of whether to upload to the web-based storage system 110), which may be associated with unknown or uncertain user behavior. In particular, the user has not provided any input indicative of a desire to upload any of the set of folders in the test data set to the web-based storage system 110, and the score evaluator engine 103 provides a prediction of whether the user is likely to select the folders for uploading. In this way, applying the final predictive model to the test data set thus allows for prediction of the likelihood that the user will wish to access the folders from the web-based storage system 110.

In some embodiments, the data training engine 102 initiates the training process by using metadata associated with user files and folders that are stored on the web-based storage system 110. The data training engine 102 may use the data that is already stored on the web-based storage system 110 to generate a predictive model based on metadata features of the user folders. When a user selects to upload a folder or set of folders from the local storage device 104 to the web-based storage system 110, the data training engine may update the model to reflect the updated set of data stored on the web-based storage system 110. In an example, updating the model may include modifying the set of features that are considered, by replacing, adding, or removing one or more of the features, changing the relative weights of the features, or both.

In some embodiments, after the data training engine 102 has generated a final resulting predictive model, the data training engine 102 periodically updates the predictive model. In particular, the data training engine 102 may periodically perform the machine learning training technique on user files in the web-based storage system 110. The update may be performed any time the user files stored on the web-based storage system 110 change, such as any time the files are added, replaced, deleted, modified, or accessed. Alternatively, the update may be performed once in a pre-specified length of time, such as once a day, a week, a month, or any other suitable period of time.

In some embodiments, the data training engine 102 is configured to perform the machine learning training technique based on different sets of user folders for different users or subsets of users. In general, there may not enough data on the web-based storage system 110 to train a different predictive model for each user. However, by grouping similar users together, the performance of the predictive models may be improved compared to having a single predictive model for all users of the web-based storage system 110. In this case, the data training engine 102 separates the set of user folders that are stored on the web-based storage system 110 into subsets of user folders. Each subset of user folders corresponds to a subset of users associated with the web-based storage system 110. The machine learning training technique is performed separately on each subset of user folders, such that multiple predictive models (i.e., one for each subset of user folders) are generated. This may be desirable when the different users have different uses of the web-based storage system 110. For example, the data training engine 102 may recognize that a first subset of users prefers to use the web-based storage system 110 to back up a large proportion of their files and folders stored on the local storage device 104. In contrast, a second subset of users stores only a small number of their files and folders on the web-based storage system 110. In this case, the data training engine 102 may recognize that these different subsets of users have different preferences for use of the web-based storage system, such that the subsets of users should be treated differently in the folder recommendation process. In some embodiments, a clustering algorithm may be performed on the aggregate set of users to form clusters of subsets of users based on the types of files and folders that the users store.

In general, any number of subsets of users may be separated and have different predictive models applied to their user files. However, one of ordinary skill in the art will recognize that there is a tradeoff between performance of the predictive model and the size of the training data set. In particular, if the users are separated into too many subsets, there may be too little user data available on the web-based storage system 110 to train a predictive model that has the desired accuracy in predictive power. The performance of the predictive model is dependent on the amount of user data available to train the predictive model, and the training data sets may be separated according to users who have different characteristics, such as users who access their user files differently, or users who have different amounts of user data stored on the web-based storage system 110.

As shown in FIG. 1 the data training engine 102 and the score evaluator engine 103 are separate devices from the web-based storage system 110 and local storage device 104. However, one of ordinary skill in the art will understand that one or both of the data training engine 102 and the score evaluator engine 103 may be stored on the same device as the web-based storage system 110 or the local storage device 104. In particular, because the data training engine 102 accesses the user data that is stored on the user data database 116, it may be desirable for the data training engine 102 to be stored on the same device as the web-based storage system 110. In this case, the data training engine 102 may access the user data from the user data database 116 without having to communicate through the network 101. Moreover, because the score evaluator engine 103 requires access to the user files database 105 and the metadata database 106, it may be desirable for the score evaluator engine 103 to be stored on the same device as the local storage device 104. In this case, the score evaluator engine 103 may access the user data from the local storage device 104 without having to communicate through the network 101. However, both the data training engine 102 and the score evaluator engine 103 may still access to the network 101 to communicate with each other, so that the data training engine 102 may transmit the resulting predictive model to the score evaluator engine 103. In embodiments, the data training engine 102 and the score evaluator engine 103 are stored on the same device, which may be on the same device as the web-based storage system 110, the local storage device 104, or a separate device.

In some embodiments, after the appropriate folders are selected for uploading to the web-based storage system 110, the files in the selected folders are ranked in accordance with a priority score that is assigned to each file. The priority score for each file is indicative of a predicted likelihood that the user will access the respective file soon after the file is uploaded to the web-based storage system. The files are then uploaded in an order defined by the priority scores. In this manner, the files that are predicted to be most urgently needed by the user to be accessible on the web-based storage system 110 are uploaded before other files that are less urgently needed. Systems and methods for ranking files for uploading to the cloud system are described in detail in relation to Kilpatrick et al., U.S. patent application Ser. No. 14/260,497, filed Apr. 24, 2014, which is hereby incorporated by reference herein in its entirety. While both automatic folder selection for uploading to the web-based storage system 110 and ranking of the files for uploading to the web-based storage system 110 may each use a predictive model for assigning scores to the folders and the files, the features used in the predictive models may be different. For example, a folder containing media content such as photo content, music content, audio content, or video content may receive a relatively high score for automatic folder selection but a relatively low score for file ranking. In particular, a user may wish to upload the media content to the web-based storage system 110 to have a backup copy of the files or to be able to access the files from multiple user devices. However, it may not be urgent for the user to have early access to these files from the web-based storage system 110 compared to other files such as documents that the user has recently modified.

In some embodiments, the training and/or machine learning techniques described herein are applied to files that are stored on the web-based storage system 110 and are downloaded to the local storage system 104. In particular, rather than providing an indication of a likelihood that the user will require access to a certain file on the web-based storage system 110, the predictive model may provide an indication of a likelihood that the user will require access to a certain file on the local storage device 104. In this case, certain files stored on the web-based storage system 110 may be prioritized over other files, such that the files with higher priority are downloaded earlier than files with lower priority. Systems and methods for prioritizing file downloads are described in detail in relation to Meyer et al., U.S. patent application Ser. No. 14/260,519, filed Apr. 24, 2014, which is hereby incorporated by reference herein in its entirety.

FIG. 2 is an example data structure 200 that is stored on the local storage device 104. As an example, data structure 200 is stored on the metadata database 106, which describes features of folders that are stored on the user files database 105. The data structure 200 includes a list of six folders, each having a folder identifier. The folder identifier may be a unique string of letters, numbers, or both that are assigned to each folder. For each folder, the data structure 200 has a field entry for the file identifiers of the file(s) in the folder, the size of the folder, a time of creation of the folder, a time of last edit of the folder, and a folder depth of the folder. The folder depth corresponds to a number of nested folders or subfolders that are associated with a folder on the local storage device 104.

As shown in FIG. 2, folder A138 includes five files, has a size of 20.4 MB, was created at 9:10 am on Jan. 21, 2014, was last edited at 1:09 pm on Jan. 24, 2014, and has a folder depth of 4. Moreover, folder A294 includes more than five files (indicated by the " . . . "), has a size of 12.2 MB, was created at 4:40 pm on Mar. 31, 2011, was last edited at 4:40 pm on Mar. 31, 2011, and has a folder depth of 9. The data structure 200 indicates that the user has modified folder A138 or a file in folder A138 more recently than folder A294. Thus, if the predictive model generated by the data training engine 102 indicates that time of last edit, folder size, or folder depth are important characteristics in predicting the likelihood that the user would select to upload a folder to the web-based storage system 110, then the score evaluator engine 103 may assign the folder A138 a higher score than the folder A294.

In an example, folder depth may play a role in how a set of folders are scored. In particular, if folders that have deep folder depths may store log files, but the user is unlikely to require access or view these log files. In this case, the folder depth feature of a file provides a predictive ability that the time of creation and time of last edit features fail to capture. Thus, accounting for the folder depth may allow the predictive model to assign a low score to these types of folders, even though the folders may include files that are created and edited often.

The predictive model that is trained by the data training engine 102 and applied by the score evaluator engine 103 is based on metadata associated with a file. Importantly, the predictive model is not based on any single feature. Instead, the predictive model is based on a combination of multiple features of folders, and various combinations of the features may cause the predictive model to assign a higher or a lower score to a folder. The metadata shown in the data structure 200 is shown as an example only, and one of ordinary skill will understand that any other suitable metadata that describes a characteristic of the folder or one or more files contained within the folder may be used in addition to or in replacement of any of the metadata shown in the data structure 200. Other metadata that may be used by the score evaluator engine 103 include the type or types of the files contained within a folder (such as whether the files contain media content, document content, image content, or any other suitable file content), the number of files within a folder, the size distribution of the files within a folder, the frequency of the files in the folder being edited or accessed, a number of subfolders contained within a folder, or any content within the files, such as keywords, title, or filenames of the files. Moreover, the metadata may include an indication of whether the folder is located on a home directory of the local storage device 104 or on an external disk coupled to the local storage device 104.

FIG. 3 is an example data structure 300 that is generated by the score evaluator engine 103, which uses the predictive model generated by the data training engine 102. The data structure 300 has a similar format as the data structure 200 in FIG. 2, except that the data structure 300 includes compressed information. In particular, the score evaluator engine 103 may compress some of the metadata of the data structure 200 into binary features. For example, the data structure 300 includes binary data for the size (i.e., large or small), time of creation (i.e., recent or not recent), time of last edit (i.e., recent or not recent), and folder depth (i.e., deep or not deep) field entries. In some embodiments, the predictive model operates on binary features rather than on the raw features (such as those that are shown in the data structure 200) because the binary features may be more efficient to process and simpler to characterize.

For each metadata column in the data structure 300, only two features are shown. However, in general, any number of features may be used for each metadata column. For example, size type may be large, medium or small. In some embodiments, different metadata are compressed differently. For example, the size metadata may be compressed into two features (i.e., large or small), as shown in the data structure 300, while the folder depth may be uncompressed. Similarly, the time of creation metadata may be compressed into two features (i.e., recent or not recent), as shown in the data structure 300, while the time of last edit may be compressed into three or more features (i.e., very recent, somewhat recent, and not recent, for example). The amount of compression performed on each type of metadata may be different for different metadata, and may be dependent on the amount of available training data used to train the predictive model.

The seventh column in the data structure 300 includes field entries for a score that is assessed by the score evaluator engine 103 for each folder. The score column is an output of the predictive model that represents a relative likelihood that the user would select to upload the associated folder to the web-based storage system 110. In an example, the score may be based on a weighted sum of the metadata characteristics, where the weights are assigned in accordance with the predictive model, and the metadata characteristics are quantified into numeric amplitude values. As shown in FIG. 3, the score ranges on a scale between 0 and 1 and is representative of a probability. However, in general, the score may range on any numeric scale, or may include a letter grade, without departing from the scope of the present disclosure.

In some embodiments, the predictive model provides relative weights that are assigned to the metadata features, and the weight is indicative of a predictive quality of each feature. For example, the type of files (not shown in FIG. 3) in a folder and the depth of the folder may be assigned a higher weight than the time of creation or the overall size of the folder in the predictive model. In particular, the system may predict with high likelihood that the user would select to synchronize folders containing media files such as photos, music, and videos, even if these folders were created a long time ago and not recently accessed. Moreover, the system may predict with slightly lower likelihood that the user would select to synchronize folders containing certain document files that have not been recently accessed or edited. The system may further predict with lower likelihood that the user would select to synchronize folders having a high folder depth and containing program files that may have many files of the same or similar type. In these cases, different metadata are assigned different weights, and the score is assessed based on the weights.

As shown in the data structures 200 and 300, only six folders are analyzed for whether to recommend for uploading to the web-based storage system 110. However, any number of folders may be analyzed by the score evaluator engine 103. Moreover, only five metadata features are shown in FIGS. 2 and 3, but in general, one of ordinary skill in the art will understand that any other suitable features may also be used. In some embodiments, the metadata features that are considered by the predictive model are automatically determined, such as by the data training engine 102. Alternatively, the local storage device 104 may be configured to prompt a user to select which features should be considered in the predictive model.

Of the six folders shown in the data structure 300, the folder A138 has the highest score of 0.9, the folder A1478 has the second highest score of 0.8, and the folder A104 has the third highest score of 0.6. The folders A294 and A392 each has a score of 0.2, and the folder A832 has the lowest score of 0.1. After the score for each folder is assessed, the score evaluator engine 103 may apply one or more thresholds to the set of scores. The one or more thresholds may be compared to the scores assessed for each folder, and a subset of the assessed folders may be selected for suggested uploading. In an example, a single threshold of 0.5 is used. The entries in the rightmost column of the data structure 300 provide an indication of whether the corresponding folder has a score that exceeds 0.5. Folders with scores above 0.5 are selected for uploading, and folders with scores below or equal to 0.5 are not selected for uploading. In an example, the user is provided with a suggestion to upload the folders with scores that exceed the threshold. The suggestion may include a list of the folders suggested for uploading, and the list of folders may be sorted in accordance with the assessed scores. The user may also be provided with an indication that the folders with scores that are below (or equal to) the threshold are not suggested for uploading. This indication may include a list of the folders not suggested for uploading. In this example, a single threshold is used. In general, any number of thresholds may be used. In particular, two thresholds th_low and th_high may be used, th_low is lower than th_high. In an example, a folder with a score that exceeds th_high may be automatically selected for suggested uploading, and a folder with a score that is below th_low may be automatically selected for no uploading. It may be challenging to provide accurate predictions for folders with scores that fall between th_low and th_high, and so these folders may not be associated with a suggestion. For these folders, the system may select to not provide any suggestion regarding whether to upload to the web-based storage system 110 or not and may provide an indication to the user that no suggestion is made for these folders. This is described below in relation to FIG. 4.

Figure 4:
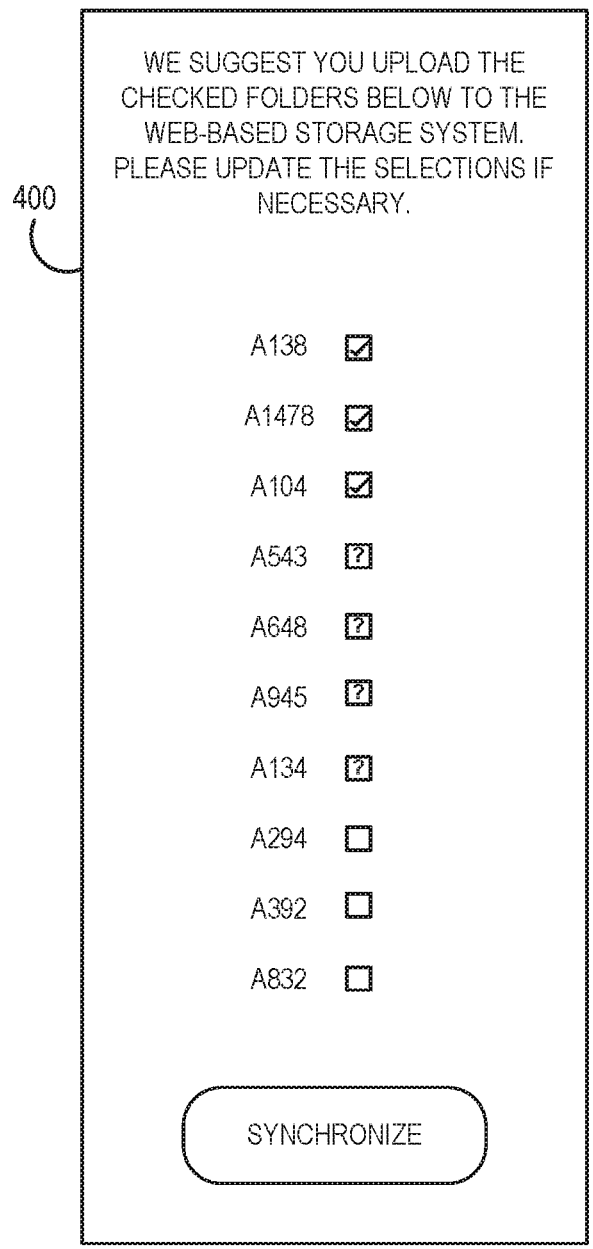
FIG. 4 is a display of a local storage device that provides recommendations for uploading of folders from the local storage device to a web-based storage system, according to an illustrative embodiment.

FIG. 4 is an example display 400 of a user interface on a local storage device, such as the local storage device 104. The display 400 includes a list of ten folders including the six folders shown in the data structures 200 and 300, and provides an indication of whether each of the folders is suggested for uploading (checked boxes) or not (unchecked boxes). As shown in the display 400, the ten folders are listed in an order of decreasing score as assessed by the score evaluator engine 103, where the first three folders are selected for suggested uploading, and the last three folders are suggested for not uploading. If th_low is 0.25 and th_high is 0.55, the four folders A532, A648, A945, and A134 have scores between 0.25 and 0.55, and no recommendation of whether or not to upload is provided to the user. This is indicated by the question marks corresponding to each of these four folders. For these folders, the user may provide a user input indicative of a selection of one or more of the folders. User selection of any of these folders causes those selected folders to be uploaded with the top three folders. Alternatively, any unselected folders are not uploaded. Moreover, as indicated in the display 400, the system allows the user to overwrite any of the suggestions. For instance, the user may deselect any of the checked boxes, or may select any of the unchecked boxes to toggle the suggestion. Any changes that the user makes to the suggestions may be recorded by the data training engine 102, such that the user's changes may be used to update the predictive model. After making any changes to the suggestions, the user may select the "synchronize" button at the bottom of the display 400 to initiate the synchronization or uploading process from the local storage device 104 to the web-based storage system 110.

Figure 5:
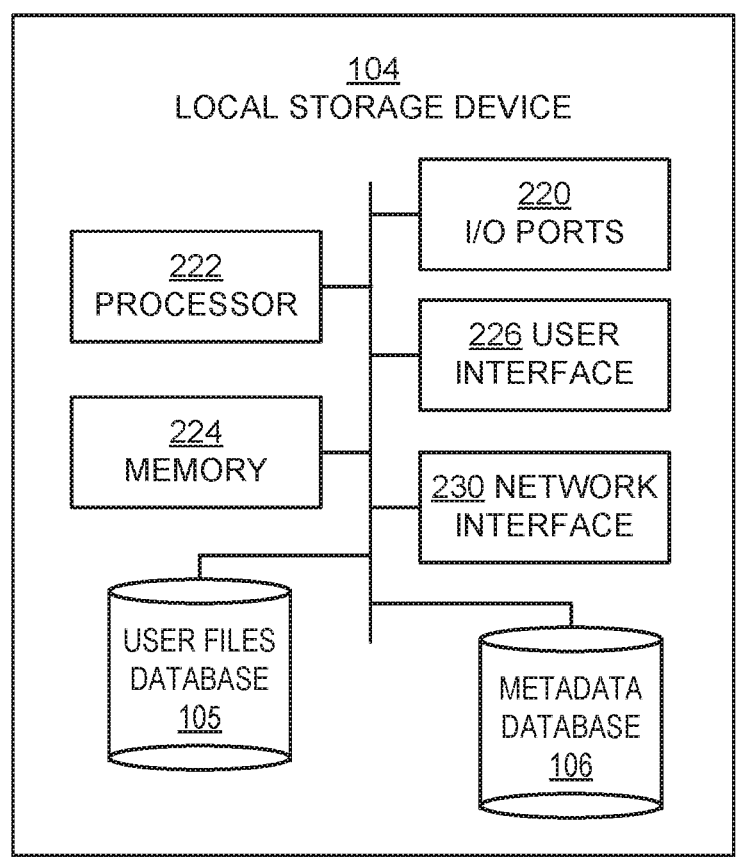
FIG. 5 is a block diagram of a local storage device that stores folders and files for uploading to a web-based storage system, according to an illustrative embodiment.

FIG. 5 is a detailed block diagram 500 of the local storage device 104. The local storage device 104 includes input/output (I/O) ports 220, a processor 222, a memory 224, a user interface 226, a network interface 230, a user files database 105 and a metadata database 106, all connected over a data bus. The user at the local storage device 104 interacts with the local storage device 104 over the user interface 226, which includes a display unit and a user input unit. For example, the user interface 226 may include a keyboard and/or a mouse that allows the user to select or deselect the folders provided in the suggestion such as shown in FIG. 4. The set of folders that are assessed may be determined automatically by the score evaluator engine 103 or by the user. For example, all the folders stored on the local storage device 104 or an external device may be initially selected to be assessed. Alternatively, a subset of the folders stored on the local storage device 104 or the external device may be assessed. After the set of folders for assessment are identified, score evaluator engine 103 applies the predictive model onto the identified folders to assign a score to each folder and determined from the score whether or not to recommend the folder for uploading to the web-based storage system 110. The network interface 230 provides for communication between the local storage device 104 and the network 101, and files in the selected folders are uploaded over the network interface 230 to the web-based storage system 110. The I/O ports 220 may include ports for a user to connect an external device to the local storage device 104. The user may then select, via the user interface 226, files stored on the external device for uploading to the web-based storage system 110. In an example, the external device may be a USB storage device or any other suitable device that may store user files.

The processor 222 may be configured to perform any of the functions described herein as being performed by the local storage device 104, the data training engine 102, or the score evaluator engine 103. In an example, the processor 222 may communicate with the web-based storage system 110 to perform a machine learning technique on the data that is stored in the user data database 116 to define a set of rules for scoring folders that are to be recommended for uploading to the web-based storage system 110. Moreover, the processor 22 may be configured to apply the set of rules to the folders to determine whether to recommend any of the folders for uploading. The memory 224 may store instructions readable by the processor 222 to carry out the processes described herein. In addition, the files and folders that are to be uploaded to the web-based storage system 110 may be temporarily stored in the memory 224.

The local storage device 104 in FIG. 4 is an illustrative example of a device that stores files and folders for uploading to and synchronizing with the web-based storage system 110. In general, any storage device that is connected to the network 101 may be used, such as personal computers, laptops, work stations, tablets, and mobile devices.

Figure 6:
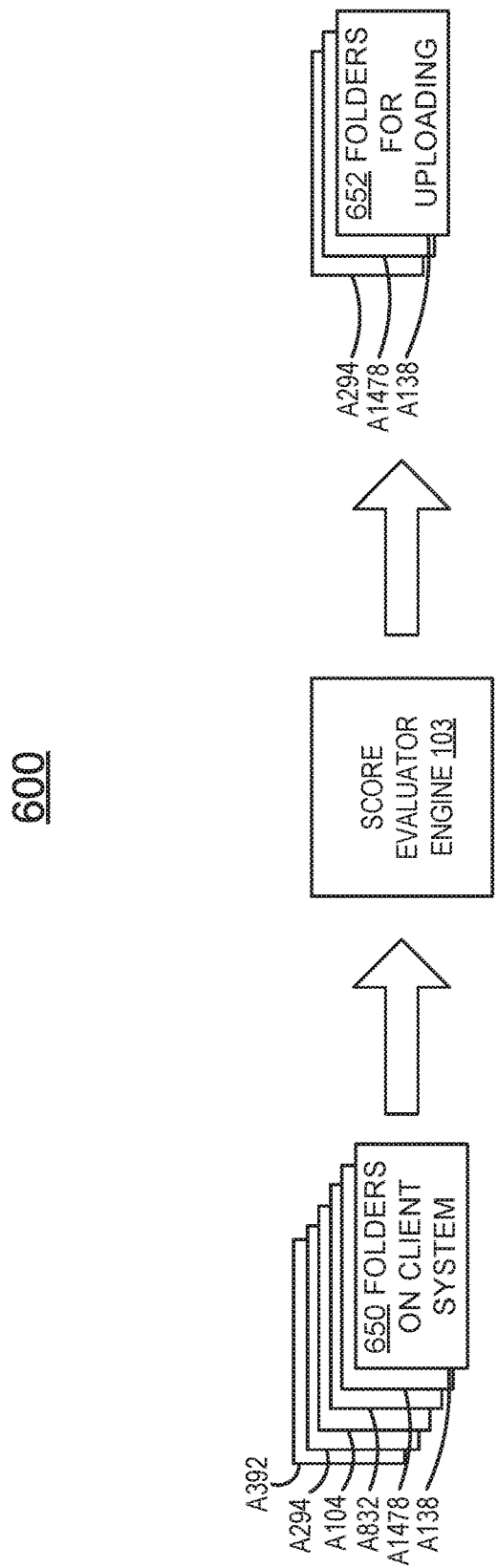
FIG. 6 is a block diagram of a score evaluator engine performing a selection of folders to be uploaded to a cloud system, according to an illustrative embodiment.

FIG. 6 is a block diagram 600 of an input and output of the score evaluator engine 103. In particular the input to the score evaluator engine 103 includes a set of folders 650 for processing to determine whether to suggest uploading to the web-based storage system 110. The folders 650 are in an order specified by the data structures 200 and 300, but in general, the folders 650 may be in any order. The score evaluator engine 103 applies a predictive model to the folders 650 to generate scores, such as the scores shown in FIG. 3. The scores are compared to one or more thresholds to determine whether to recommend a folder for uploading, and the output of the score evaluator engine 103 is a set of folders 652 recommended for uploading. By providing these recommended folders in this manner, the score evaluator engine 103 provides a way for folders that are predicted to be selected by a user for uploading to the cloud to be automatically selected. Rather than having to manually select each folder on the local storage device 104 for uploading to the web-based storage system 110, the user is presented with a set of recommended folders for uploading, thereby saving the user's time and providing the user with a recommendation for uploading a set of folders that the user may not have considered to upload without the recommendation.

Figure 7:
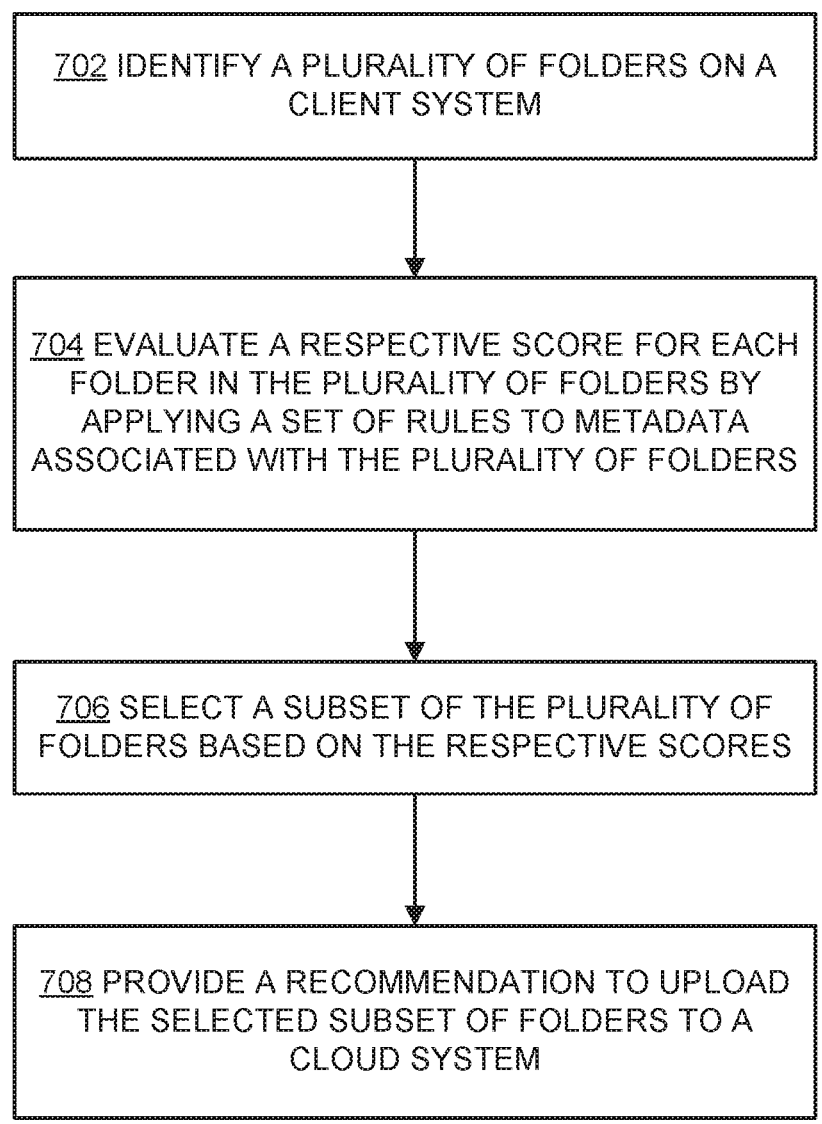
FIG. 7 is a flow chart of an illustrative method for selecting a set of folders for recommending to be uploaded to a cloud system, according to an illustrative embodiment.

FIG. 7 is a flow chart of an illustrative method 700 for providing a recommendation to upload a subset of folders files that are stored on a client system (such as the local storage device 104) to a cloud system (such as the web-based storage system 110). The method 700 may be executed by an engine such as the score evaluator engine 103, and includes the steps of identifying a plurality of folders on a client system for uploading to a cloud system (step 702), evaluating a respective score for each folder in the plurality of folders by applying a set of rules to metadata associated with the plurality of folders (step 704), selecting a subset of the plurality of folders based on the respective scores (step 706), and providing a recommendation to upload the selected subset of folders to a cloud system (step 708).

At step 702, the score evaluator engine 103 identifies a plurality of folders that are stored on a client system for uploading to a cloud system. Examples of a client system include the local storage device 104 or any other suitable device that is capable of storing user files and folders and is configured to upload files and folders to a cloud system, such as the web-based storage system 110 described in relation to FIG. 1. The plurality of folders may be the set of all folders on the client system, a subset thereof, or may be selected by the user for assessing a recommendation.

At step 704, the score evaluator engine 103 evaluates a respective score for each folder in the plurality of folder by applying a set of rules generated by the data training engine 102 to metadata associated with the plurality of folders. In an example, the metadata shown in the data structures 200 or 300 may be provided to the score evaluator engine 103, which assigns a score in accordance with the predictive model that was trained by the data training engine 102. In particular, the set of rules may define whether one combination of metadata features would cause a folder to receive a higher score compared to another folder with a different combination of metadata features. In other words, having one or more certain combinations of metadata features may cause a folder to be assigned a higher score than other folders with different combinations of metadata features. An example score is shown in the seventh column of FIG. 3. As was described above, the score of a folder may correspond to a predicted likelihood that the user will select to upload the folder to the web-based storage system 110.

At step 706, a subset of the plurality of folders identified at step 702 are selected based on the respective scores evaluated at step 704. For example, the subset may be selected to be the folders in the plurality of folders that have a score that exceeds a threshold. The threshold may be a predetermined number, may be determined based on the scores that are assessed at step 704, or a combination of both. In one example, the threshold may be a fixed number on a scale of 0 to 1, such as 0.5, 0.6, 0.7, 0.8, 0.9, or any other suitable number on any other suitable scale. In another example, the threshold may be set such that the selected subset of folders correspond to those folders in the plurality of folders with the highest percentage of scores. The percentage may be the top 5%, 10%, 20%, 30%, or any other suitable percentage of assessed scores. In another example, the threshold may be initially set to a fixed predetermined number, but then adjusted based on the distribution of the assessed scores. In particular, if there are a number of folders with scores that fall barely below the threshold, the threshold may be adjusted or slightly decreased such that those folders are also selected to be part of the selected subset.

At step 708, a recommendation is provided to the user to upload the subset of folders selected at step 706 to a cloud system. An example of such a recommendation is shown and described in relation to FIG. 4. Moreover, the recommendation may further include a recommendation to not upload a second subset of folders, which may correspond to folders with assessed scores that fall below a second threshold. The second threshold may be determined in a similar or a different manner from the first threshold described in relation to step 706. In particular, the second threshold may be a predetermined fixed value, may be based on the scores assessed at step 704, or a combination of both. The second threshold may be used to identify the second subset of folders that are not recommended for uploading. As shown in FIG. 4, no recommendation may be provided for folders with scores that fall between the first and second thresholds.

Figure 8:
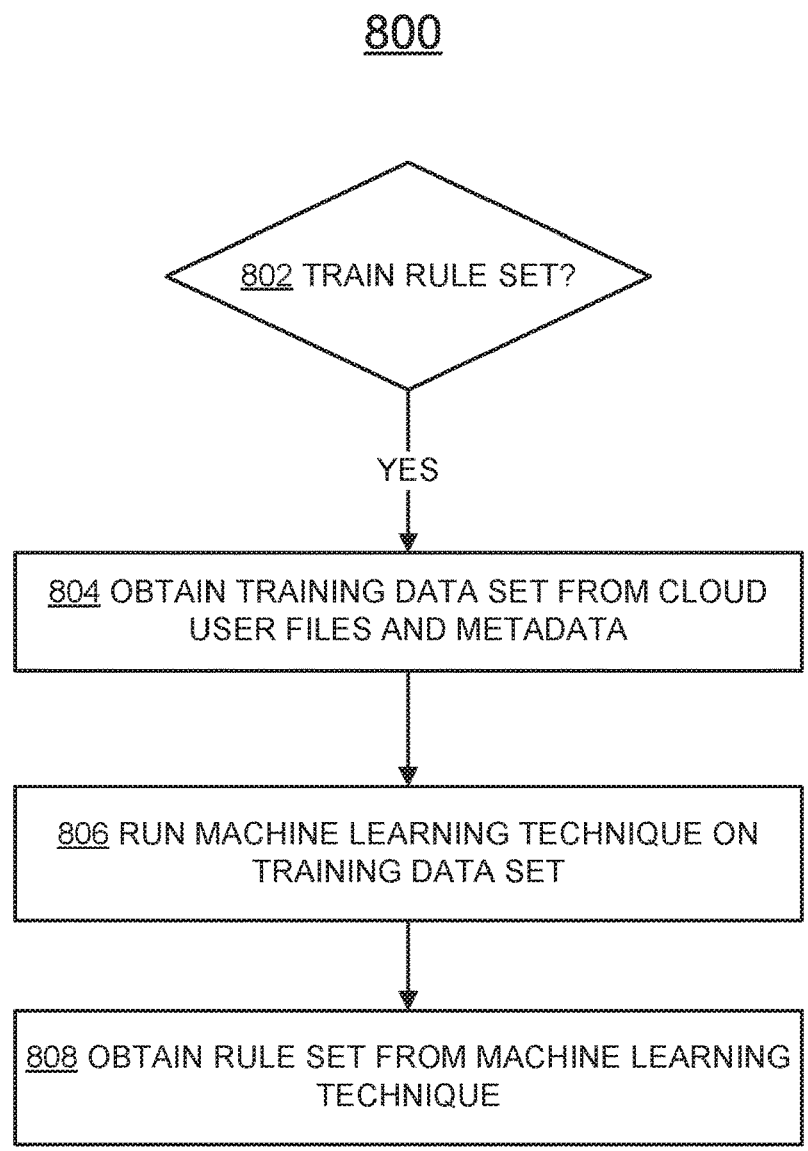
FIG. 8 is a flow chart of an illustrative method for training a set of rules based on data associated with folders stored on a cloud system, according to an illustrative embodiment.

FIG. 8 is a flowchart of an illustrative method 800 for training a set of rules based on data that is stored on a cloud system. The method 800 may be executed by the data training engine 102, and includes the steps of determining whether to train a set of rules (decision block 802), obtaining training data set from cloud user files and metadata (step 804), running a machine learning technique on the training data set (step 806), and obtaining a set of rules from the machine learning technique (step 808).

At decision block 802, the data training engine 102 determines whether to train a set of rules. In particular, the set of rules corresponds to a predictive model that predicts a likelihood that a user will select to upload a certain folder from the client system to the cloud system. The data training engine 102 may determine to train a set of rules when a threshold amount of user data is reached on the cloud system. In particular, training a set of rules may require a minimal amount of training data, such that it may be determined to train a set of rules when that minimal amount of training data is reached. In some embodiments, even after a set of rules has been trained, it may be desirable to retrain or update the set of rules scheme after the training data changes. In particular, the training data corresponds to user files, folders, and metadata stored on the cloud system, and any time the user files or folders are deleted, added, modified, or otherwise updated, it may be desirable to retrain the set of rules. Alternatively, the training data may be assessed periodically to determine whether the training data has changed by a threshold amount since the last time the set of rules was trained. When the training data has changed by the threshold amount, the set of rules may be retrained or updated. In another example, rather than determining whether to train the set of rules based on changes to the user data, the set of rules may be retrained or updated periodically, such as every day, week, month, or any other suitable time period. In another example, the data training engine 102 may determine to train a set of rules upon receiving a user input to update the set of rules.

At step 804, the data training engine 102 obtains a training data set from cloud user files and metadata. As an example, the training data set may correspond to metadata associated with the cloud user files stored on user data database 116, and optionally a frequency that the users access and edit the cloud user files.

At step 806, the data training engine 102 runs a machine learning technique on the training data. The machine learning technique may include providing a set of rules defining which features of a folder and the files contained within the folder are predictive of a likelihood that the user will select to upload the contents of the folder to the cloud system. To run the machine learning technique, the data training engine 102 receives two inputs: an input vector (i.e., the metadata) and an answer vector (i.e., whether the folder is uploaded). The data training engine 102 applies statistical modeling methods to fit a predictive model that is used to predict the likelihood of uploading from the metadata. The predictive model includes the set of rules that define how certain features of a folder, such as its metadata, are predicted to affect the likelihood of uploading of that folder by the user. The predicted likelihoods of uploading (as predicted by the predictive model) are compared to the actual uploading selections for the user and possibly other users (i.e., the answer vector). If the predictions mostly match the actual user selections, the predictive model has performed well. However, if there are substantial differences between the predictions and the actual user selections, one or more parameters of the predictive model may be updated, and the updated predictions may be compared to the actual user selections. This process may be iteratively repeated until the performance of the predictive model satisfies one or more criteria. After it is determined that the one or more criteria are satisfied, the predictive model corresponds to a set of rules that is used to score the set of folders and select a subset of the folders for uploading.

At 808, the data training engine 102 obtains a set of rules from the machine learning technique. As described above, the set of rules defines a relative weight or a relative importance of each feature of a folder for predicting a likelihood that the user will select to upload the folder to the cloud system. After being trained, the set of rules is transmitted to the score evaluator engine 103, which applies the set of rules to evaluate a score for the test data set, corresponding to the set of folders stored on the local storage device 104. In this way, applying the trained set of rules to the test data set allows for prediction of the likelihood that the user will wish to access the content in the folder from the cloud system.

Figure 9:
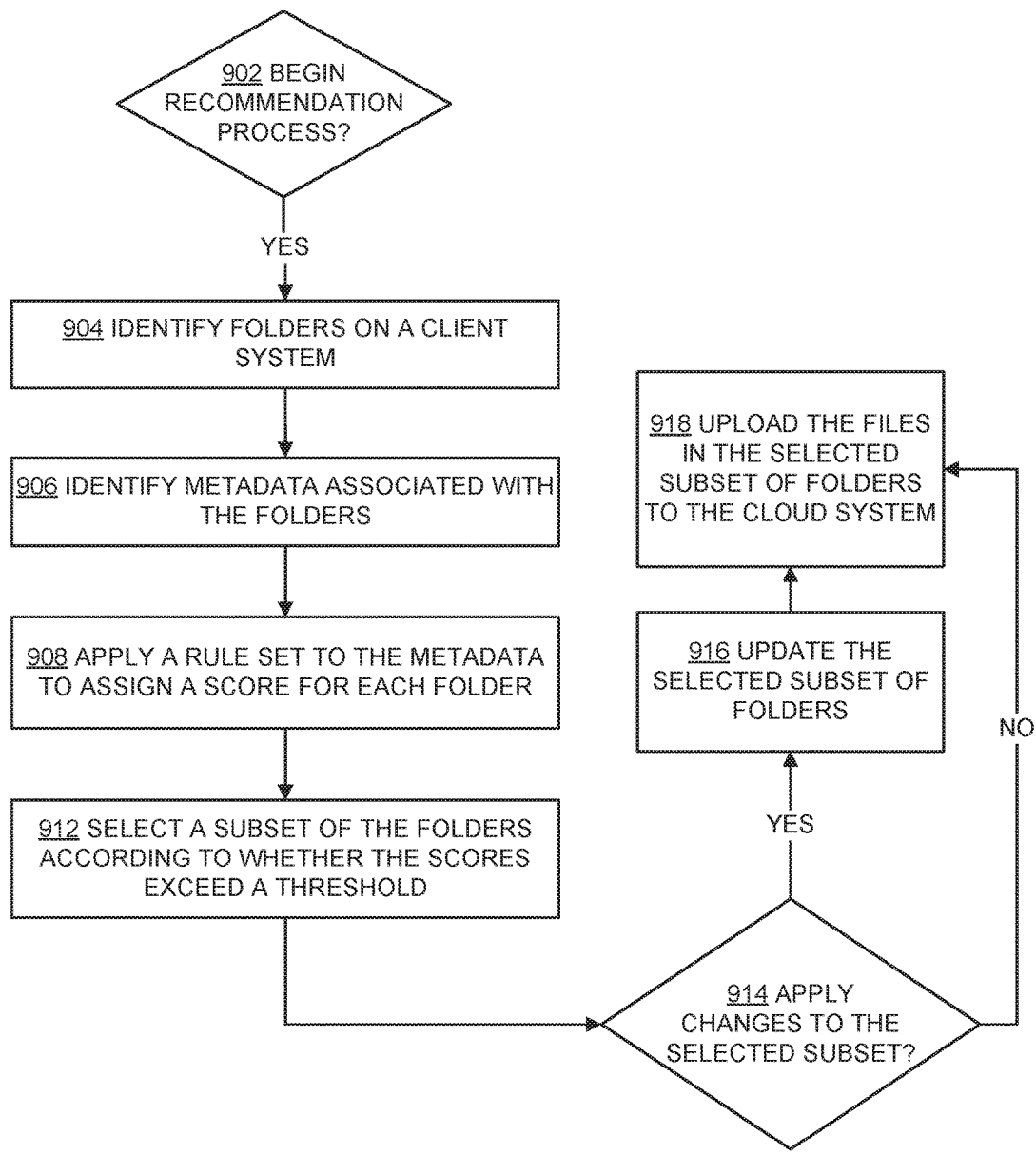
FIG. 9 is a flow chart of an illustrative method for applying a set of rules to folders stored on a client system to select a subset of the folders for uploading to a cloud system, according to an illustrative embodiment.

FIG. 9 is a flowchart of an illustrative method 900 for selecting a set of folders for uploading from a client system (such as the local storage device 104) to a cloud system (such as the web-based storage system 110). The method 900 may be performed by the client system and/or the score evaluator engine 103 and includes the steps of beginning a recommendation process (decision block 902), identifying folders on a client system (step 904), identifying metadata associated with the folders (step 906), applying a set of rules to the metadata to assign a score for each folder (step 908), selecting a subset of the folders according to whether the scores exceed a threshold (step 912), and determining whether to apply changes to the selected subset (decision block 914). If changes should be applied, the select subset of folders is updated (step 916) before the files in the select subset of folders are uploaded to the cloud system (step 918).

At decision block 902, the score evaluator engine 103 determines to begin the recommendation process. The recommendation process may be initiated by the user, who may provide an input into a user interface on the local storage device 104 that indicates a desire to view a set of folders that are recommended for uploading. Alternatively, the score evaluator engine 103 may initiate the recommendation process upon detection that one or more folders on the local storage device 104 are not synchronized with or are not uploaded to the web-based storage system 110. At step 904, the score evaluator engine 103 identifies a set of folders on the client system for assessing. The identified set of folders may include all of the folders stored on the client system, or any subset thereof. At step 906, the score evaluator engine 103 identifies metadata associated with the folders identified at step 904. As an example, the metadata shown in the data structure 200 may be identified. In general, any metadata may be used by the score evaluator engine 103 and may include any of the type or types of the files contained within a folder (such as whether the files contain media content, document content, image content, or any other suitable file content), the number of files within a folder, the size distribution of the files within a folder, the frequency of the files in the folder being edited or accessed, a number of subfolders contained within a folder, or any content within the files, such as keywords, title, or filenames of the files. Moreover, the metadata may include an indication of whether the folder is located on a home directory of the local storage device 104 or on an external disk coupled to the local storage device 104.

At step 908, the score evaluator engine 103 applies a set of rules to the metadata identified at step 906 to assign a score to each folder identified at step 904. In particular, the set of rules may be trained by the data training engine 102 in accordance with the method described in relation to FIG. 8, and may be transmitted to the score evaluator engine 103. As described above, the score assigned to each respective folder is indicative of a predicted likelihood that the user will select the respective folder for uploading to or synchronizing with the cloud system. In particular, the score as shown in the data structure 300 may correspond to the score that is assigned by the score evaluator engine 103 at step 908. At step 912, a subset of the folders is selected according to whether the scores exceed a threshold. In particular, the scores for the folders may be compared to one or more thresholds. Folders with scores that exceed the highest threshold may be selected for recommending to be uploaded to the cloud system. Folders with scores that exceed the lowest threshold may be confidently recommended to the user for not uploading. Folders with scores in between thresholds may be less confidently recommended for uploading, less confidently not recommended for uploading, or an indication may be provided that no recommendation is made for these folders.

At decision block 914, it is determined whether to apply changes to the selected subset selected at step 912. In particular, as described in relation to FIG. 4, the user may select to change one or more of the recommendations provided by the score evaluator engine 103. Upon receiving a change from the user, the method 900 proceeds to step 916 to update the selected subset of folders. After the selected subset is updated at step 916, the method 900 proceeds to step 918 to upload the files in the selected subset of folders to the cloud system. Alternatively, if it is determined that no changes are necessary at decision block 914, the method 900 proceeds directly to step 918 to upload the files in the selected subset of folders to the cloud system.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A method comprising:
identifying, by at least one processor, a plurality of folders on a client system, wherein the folders are associated with metadata;
evaluating, by the processor, a score for each folder among the folders by applying a set of rules to the metadata, wherein the metadata comprises a depth of the folder among the folders, and wherein the set of rules is applied to the depth of the folder to evaluate the score of the folder, the depth of the folder among the folders corresponds to a number of subfolders within the folder;
selecting, by the processor, a first subset of the folders based on the score of each of the folders;
providing, by the processor via a user interface, a first user-selectable recommendation item to upload content of selected ones of the folders to a cloud system, wherein the provided first user-selectable recommendation item allows for user selection and deselection of each of the folders, and wherein each of the folders in the first subset is selected by default;
receiving, by the processor via the user interface, a user selection or deselection of one or more of the folders in the first user-selectable recommendation item to accept or modify the first user-selectable recommendation item to upload the content of the selected ones of the folders to the cloud system;
responsive to the receipt of the user selection or deselection of the first user-selectable recommendation item to accept or modify the first user-selectable recommendation item, uploading, by the processor, the content of the selected ones of the folders to the cloud system.

2. The method of claim 1, wherein selecting the first subset of the folders comprises selecting each of the folders where the score exceeds a first threshold, and wherein the evaluation of the score is inversely related to the depth of the folder.

3. The method of claim 2, further comprising:
selecting, by the processor, a second subset of the folders, wherein selecting the second subset of the folders comprises selecting each of the folders where the score is below a second threshold that is lower than the first threshold; and
providing, by the processor via the user interface, a second user-selectable recommendation item to not upload the second subset of the folders to the cloud system, wherein the provided second user-selectable recommendation item allows for user selection and deselection of each of the folders, and wherein each of the folders in the second subset is selected by default and each of the folders other than the second subset is not selected by default.

4. The method of claim 1, wherein the score for each folder in the folders is indicative of a likelihood that a user would select the folder to upload content of the folder to the cloud system.

5. The method of claim 1, wherein the set of rules is formed based on a machine learning technique and is trained on training data comprising existing cloud data in a cloud system, and wherein:
the training data expands by incorporating the user selection or deselection of the first user-selectable recommendation item to modify the first user-selectable recommendation item; and
the machine learning technique is updated when the training data expands by a predetermined threshold.

6. The method of claim 1, wherein the metadata to which the set of rules is applied for each folder in the folders comprises at least two of: a size of the folder, a number of files in the folder, types of files in the folder, a number of document files in the folder, file data in the folder, content of files in the folder, a number of subfolders in the folder, and a frequency of accesses to files in the folder.

7. The method of claim 6, further comprising compressing one or more of the depth, the size, the number of files, the type, the number of document files, the file data, the content, the number of subfolders, or the frequency into a set of binary features that describe each folder in the folders.

8. A system comprising:
at least one memory that stores instructions, and
at least one processor configured to execute the instructions to:
identify a plurality of folders on a client system, wherein the folders are associated with metadata;
evaluate a score for each folder among the folders by application of a set of rules to the metadata, wherein the metadata comprises a depth of the folder among the folders, and wherein the set of rules is applied to the depth of the folder to evaluate the score of the folder, the depth of the folder among the folders corresponds to a number of subfolders within the folder;
select a first subset of the folders based on the score of each of the folders;
provide, via a user interface, a first user-selectable recommendation item to upload content of selected ones of the folders to a cloud system, wherein the provided first user-selectable recommendation item allows for user selection and deselection of each of the folders, and wherein each of the folders in the first subset is selected by default;
receive, via the user interface, a user selection or deselection of one or more of the folders in the first user-selectable recommendation item to accept or modify the first user-selectable recommendation item to upload the content of the selected ones of the folders to the cloud system;
responsive to the receipt of the user selection or deselection of the first user-selectable recommendation item to accept or modify the first user-selectable recommendation item, upload, the content of the selected ones of the folders to the cloud system.

9. The system of claim 8, wherein, to select the first subset of the folders, the processor is further configured to execute the instructions to select each of the folders where the score exceeds a first threshold, and wherein the evaluation of the score is inversely related to the depth of the folder.

10. The system of claim 9, wherein the processor is further configured to execute the instructions to:
select a second subset of the folders, wherein, to select the second subset of the folders, the processor is further configured to execute the instructions to select each of the folders where the score is below a second threshold that is lower than the first threshold; and provide, via the user interface, a second user-selectable recommendation item to not upload the second subset of the folders to the cloud system, wherein the provided second user-selectable recommendation item allows for user selection and deselection of each of the folders, and wherein each of the folders in the second subset is selected by default and each of the folders other than the second subset is not selected by default.

11. The system of claim 8, wherein the score for each folder in the folders is indicative of a likelihood that a user would select the folder to upload content of the folder to the cloud system.

12. The method of claim 8, wherein the set of rules is formed based on a machine learning technique and is trained on training data comprising existing cloud data in a cloud system, and wherein:

the training data expands by incorporating the user selection or deselection of the first user-selectable recommendation item to modify the first user-selectable recommendation item; and the machine learning technique is updated when the training data expands by a predetermined threshold.

13. The system of claim 8, wherein the metadata to which the set of rules is applied for each folder in the folders comprises at least two of: a size of the folder, a number of files in the folder, types of files in the folder, a number of document files in the folder, file data in the folder, content of files in the folder, a number of subfolders in the folder, and a frequency of accesses to files in the folder.

14. The system of claim 13, wherein the processor is further configured to execute the instructions to compress one or more of the depth, the size, the number of files, the type, the number of document files, the file data, the content, the number of subfolders, or the frequency into a set of binary features that describe each folder in the folders.

15. A non-transitory computer-readable memory having instructions stored therein that, when executed by at least one processor, cause the processor to:

identify, by the processor, a plurality of folders on a client system, wherein the folders are associated with metadata;

evaluate, by the processor, a score for each folder among the folders by application of a set of rules to the metadata, wherein the metadata comprises a depth of the folder among the folders, and wherein the set of rules is applied to the depth of the folder to evaluate the score of the folder, the depth of the folder among the folders corresponds to a number of subfolders within the folder;

select, by the processor, a first subset of the folders based on the score of each of the folders;

provide, by the processor via a user interface, a first user-selectable recommendation item to upload content of selected ones of the folders to a cloud system, wherein the provided first user-selectable recommendation item allows for user selection and deselection of each of the folders, and wherein each of the folders in the first subset is selected by default;

receive, by the processor via the user interface, a user selection or deselection of one or more of the folders in the first user-selectable recommendation item to accept or modify the first user-selectable recommendation item to upload the content of the selected ones of the folders to the cloud system;

responsive to the receipt of the user selection or deselection of the first user-selectable recommendation item to accept or modify the first user-selectable recommendation item, upload, by the processor, the content of the selected ones of the folders to the cloud system.

16. The computer-readable memory of claim 15, wherein, to select the first subset of the folders, the instructions are further to cause processor to select each of the folders where the score exceeds a first threshold, and wherein the evaluation of the score is inversely related to the depth of the folder.

17. The computer-readable memory of claim 16, wherein the instructions are further to cause the processor to:

select, by the processor, a second subset of the folders, wherein, to select the second subset of the folders, the instructions are further to cause the processor to select each of the folders where the score is below a second threshold that is lower than the first threshold; and provide, by the processor via the user interface, a second user-selectable recommendation item to not upload the second subset of the folders to the cloud system, wherein the provided second user-selectable recommendation item allows for user selection and deselection of each of the folders, and wherein each of the folders in the second subset is selected by default and each of the folders other than the second subset is not selected by default.

18. The computer-readable memory of claim 15, wherein the score for each folder in the folders is indicative of a likelihood that a user would select the folder to upload content of the folder to the cloud system.

19. The computer-readable memory of claim 15, wherein the metadata to which the set of rules is applied for each folder in the folders comprises at least two of: a size of the folder, a number of files in the folder, types of files in the folder, a number of document files in the folder, file data in the folder, content of files in the folder, a number of subfolders in the folder, and a frequency of accesses to files in the folder.

20. The computer-readable memory of claim 19, wherein the instructions are further to cause the processor to compress one or more of the depth, the size, the number of files, the type, the number of document files, the file data, the content, the number of subfolders, or the frequency into a set of binary features that describe each folder in the folders.

* * * * *